(12) United States Patent
Long

(10) Patent No.: US 8,949,369 B2
(45) Date of Patent: Feb. 3, 2015

(54) TWO-TIER ARCHITECTURE FOR REMOTE ACCESS SERVICE

(75) Inventor: James Long, Hong Kong (CN)

(73) Assignee: UX Ltd., Grand Cayman (KY)

( * ) Notice: Subject to any disclaimer, the term of this patent is extended or adjusted under 35 U.S.C. 154(b) by 656 days.

(21) Appl. No.: 12/136,318

(22) Filed: Jun. 10, 2008

(65) Prior Publication Data

US 2008/0313305 A1 Dec. 18, 2008

Related U.S. Application Data

(60) Provisional application No. 60/943,480, filed on Jun. 12, 2007.

(51) Int. Cl.
  *G06F 15/16* (2006.01)
(52) U.S. Cl.
  USPC .......................................................... 709/217
(58) Field of Classification Search
  USPC .......................................................... 709/217
  See application file for complete search history.

(56) References Cited

U.S. PATENT DOCUMENTS

| | | | |
|---|---|---|---|
| 5,717,863 | A | 2/1998 | Adamson et al. |
| 5,729,682 | A | 3/1998 | Marquis et al. |
| 5,754,775 | A | 5/1998 | Adamson et al. |
| 5,819,038 | A | 10/1998 | Carleton et al. |
| 6,047,314 | A | 4/2000 | Pommier et al. |
| 6,167,432 | A | 12/2000 | Jiang |
| 6,331,855 | B1 | 12/2001 | Schauser |
| 6,763,501 | B1 | 7/2004 | Zhu et al. |
| 7,130,883 | B2 | 10/2006 | Zhu et al. |
| 7,203,755 | B2 | 4/2007 | Zhu et al. |
| 2002/0091769 | A1* | 7/2002 | Drozdzewicz et al. ........ 709/204 |
| 2002/0194272 | A1 | 12/2002 | Zhu |
| 2003/0050966 | A1* | 3/2003 | Dutta et al. .................... 709/203 |
| 2003/0084169 | A1 | 5/2003 | Zhu et al. |
| 2003/0105812 | A1 | 6/2003 | Flowers et al. |
| 2003/0125837 | A1* | 7/2003 | Walace et al. ................. 700/237 |
| 2003/0184902 | A1* | 10/2003 | Thiesfeld ......................... 360/48 |
| 2004/0260745 | A1* | 12/2004 | Gage et al. ..................... 709/200 |

(Continued)

FOREIGN PATENT DOCUMENTS

CN 1925444 A 3/2007

OTHER PUBLICATIONS

PCT International Search Report and Written Opinion, PCT/US08/66583, Sep. 17, 2008, 7 pages.

(Continued)

*Primary Examiner* — Sulaiman Nooristany
(74) *Attorney, Agent, or Firm* — HM Law Group LLP; Vani Moodley, Esq

(57) ABSTRACT

Remote access service is provided between two or more computers on a network to facilitate a variety of activities, including desktop sharing, web-meetings, and web-conferences. A first computer sends its connection information to a server. The server stores the connection information for the first computer. A second computer may make a request to the server to remotely access the first computer. The server sends to the second computer the connection information it has stored for the first computer. The second computer uses the connection information for the first computer to send to the first computer connection information for the second computer via direct network connection. From this point on, the first computer and the second computer exchange data for remote access via a direct network connection, independently of the server.

17 Claims, 13 Drawing Sheets

(56) References Cited

U.S. PATENT DOCUMENTS

| | | |
|---|---|---|
| 2005/0010639 A1 | 1/2005 | Long et al. |
| 2005/0149481 A1 | 7/2005 | Hesselink et al. |
| 2006/0037072 A1* | 2/2006 | Rao et al. .................. 726/14 |
| 2009/0177772 A1 | 7/2009 | Guan |

OTHER PUBLICATIONS

Chinese First Office Action, Chinese Application No. 200880001241.0, May 11, 2010, 8 pages.
United Kingdom Office Action, United Kingdom Patent Application No. GB0908832.9, May 13, 2011, 2 pages.
Chinese Second Office Action, Chinese Application No. 200880001241.0, Dec. 6, 2011, 18 pages.
Chinese Office Action, Chinese Application No. 200880001241.0, Mar. 1, 2012, 17 pages.
United Kingdom Intellectual Property Office Second Examination Report, UK Application No. GB0908832.9, Aug. 11, 2011, 3 pages.
United Kingdom Intellectual Property Office Third Examination Report, UK Application No. GB0908832.9, Dec. 6, 2011, 3 pages.

* cited by examiner

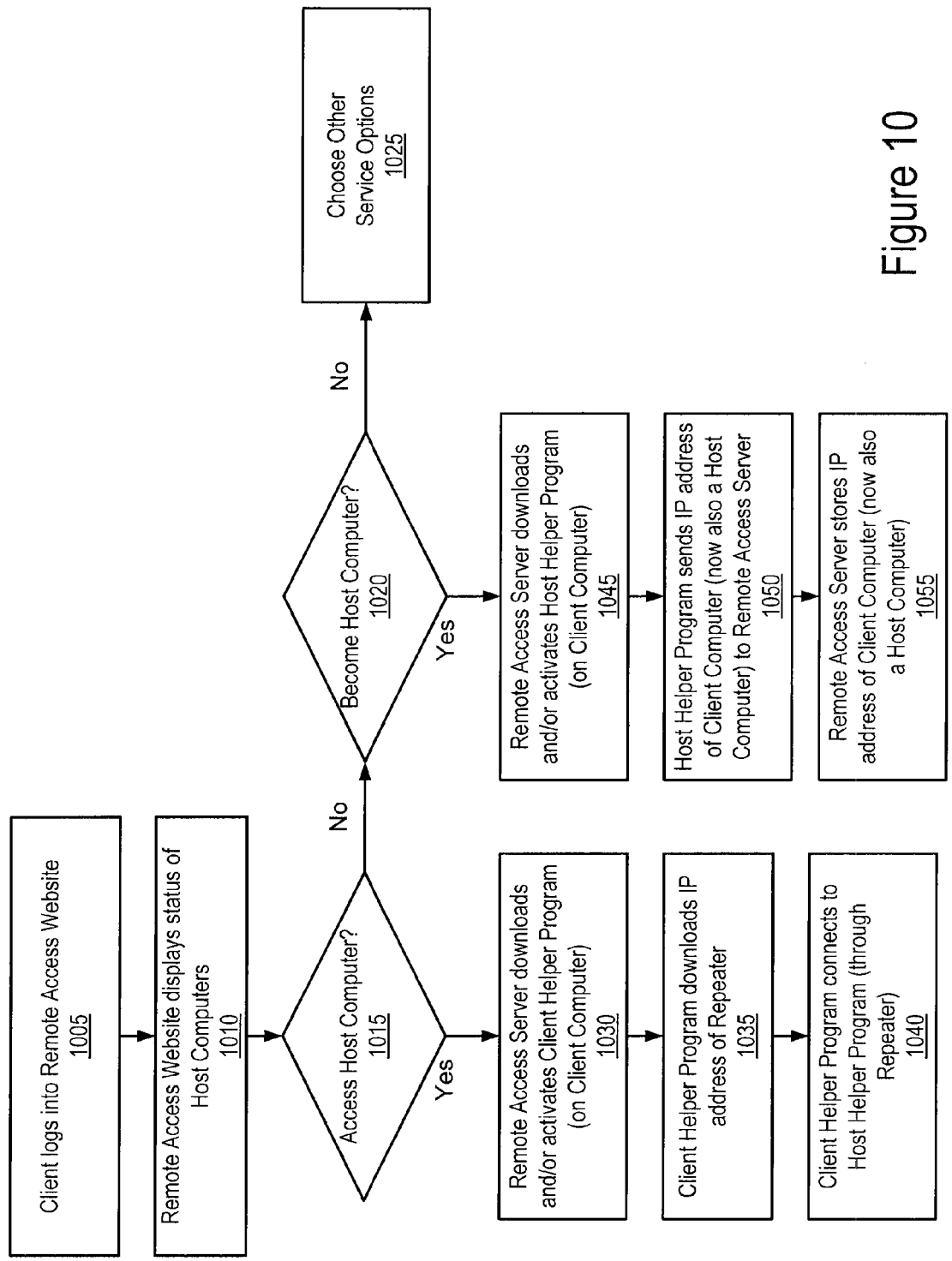

TWO-TIER ARCHITECTURE FOR REMOTE ACCESS SERVICE

CROSS-REFERENCE TO RELATED APPLICATION

This application claims priority under 35 U.S.C. §119(e) from co-pending U.S. Provisional Patent Application No. 60/943,480 entitled "Two-Tier Architecture for Remote Access Service," filed on Jun. 12, 2007, which is incorporated by reference herein in its entirety.

BACKGROUND OF THE INVENTION

1. Field of the Invention

The present invention relates to creating network connections within computer networks. More specifically, the present invention relates to creating direct network connections between computers via the Internet.

2. Description of the Related Art

A first computer on a network (e.g., the Internet) may remotely access a second computer on the network, making possible many collaborative tasks. For example, a user may use the first computer to remotely access the second computer and thereby remotely perform tasks on the second computer, a concept commonly referred to as desktop sharing. As another example, a user may use a first computer to host a meeting or a conference over the network. The meeting or conference may be realized by users of one or more other computers on the network remotely accessing the first computer, a realization commonly referred to as a web-meeting. However, in order for computers to remotely access one another over a computer network, a network connection must first be created between the computers.

Referring now to FIG. 1, a conventional three-tier architecture for creating network connections between two computers is illustrated. The conventional three-tier architecture includes a host computer 105, a client computer 115, and a remote access server 120 providing a remote access website 110. The host computer 105 is linked to the remote access server 120 by a network connection 125. The client computer 115 is also linked to the remote access server 120 by a network connection 130. The remote access server 120 acts as an intermediary between the host computer 105 and the client computer 115, with all data packets exchanged between the two computers 105, 115 passing through the server 120. Thus, the network connection between the two computers 105, 115 requires that the remote access server 120 play an active role in data transfer throughout the duration of the connection. Such a three-tier architecture has a number of undesirable drawbacks. A first drawback is the large amount of bandwidth and computing resources consumed by the remote access server 120. A second drawback is that system complexity increases rapidly as more host computers 105 and more client computers 115 access the remote access server 120. A third drawback is that the remote access server 120 represents a single point-of-failure within the system, thereby limiting system robustness.

SUMMARY OF THE INVENTION

Embodiments of the present invention include a method of providing remote access services between two or more computers on a network to facilitate a variety of activities, including desktop sharing, web-meetings, and web-conferences.

In one embodiment, a first computer sends its connection information to a server. The server stores the connection information for the first computer. If a second computer wants to remotely access the first computer, the second computer may make a request to the server. The server sends to the second computer the connection information it has stored for the first computer. The second computer uses the connection information for the first computer to send to the first computer connection information for the second computer via direct network connection. From this point on, the first computer and the second computer exchange data for remote access via a direct network connection, independently of the server.

In another embodiment, the first computer may be in a private network and may not be publicly accessible over a network. However, the first computer is communicatively coupled to a repeater which can be publicly accessed over the network. The first computer sends the connection information corresponding to the repeater to a server. If a second computer wants to remotely access the first computer, the second computer may make a request to the server to connect to the first computer. The server sends to the second computer the connection information it has stored for the repeater. The second computer uses the connection information for the repeater to send to the first computer connection information for the second computer via a direct network connection through the repeater. From this point on, the first computer and the second computer exchange data for remote access via a direct network connection, independently of the server.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 10 is a flowchart illustrating a process performed by a client computer to provide network connections between computers over a computer network in accordance with another embodiment of the present invention.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Architectural Considerations

Figure 1:
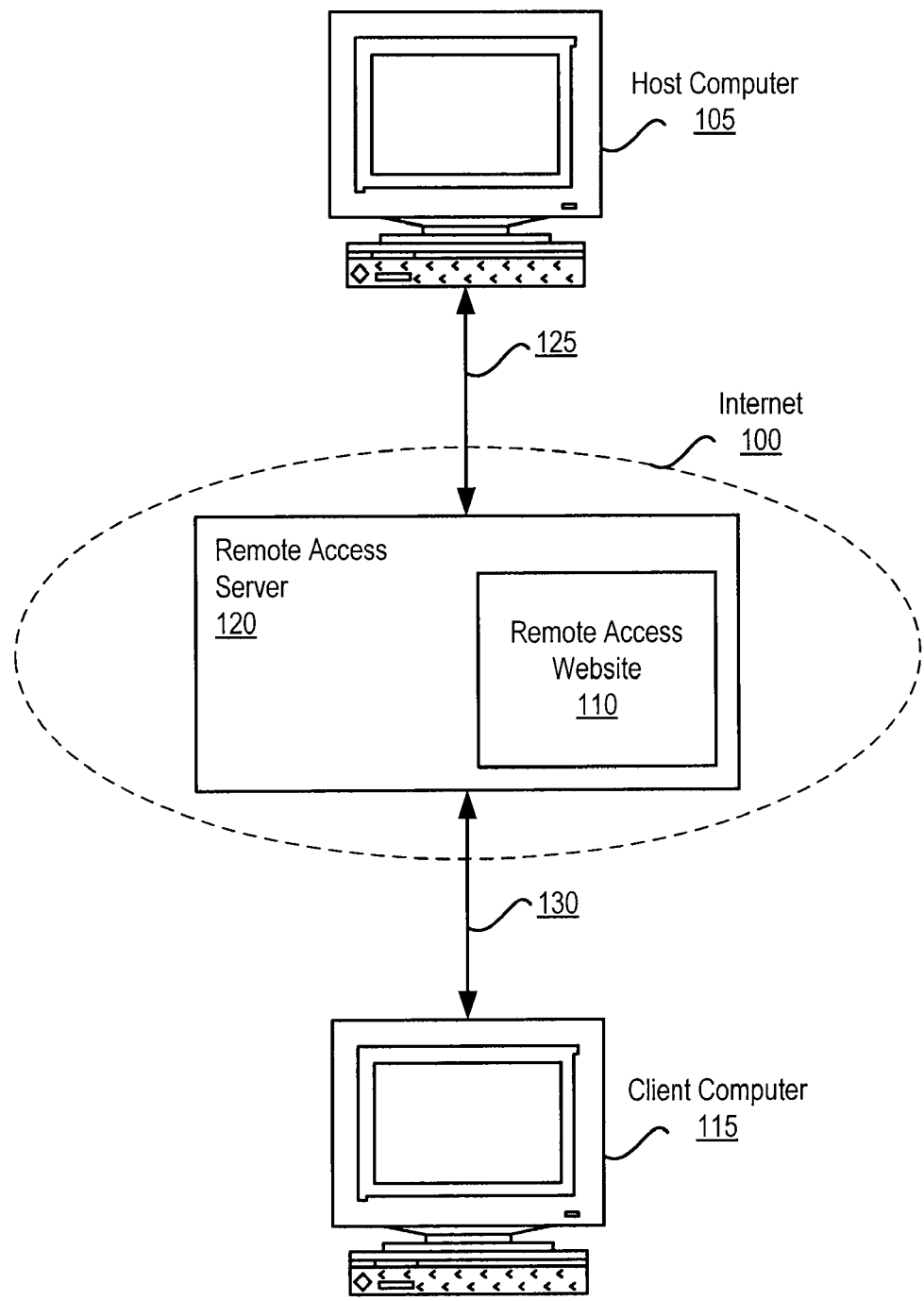
FIG. 1 is a block diagram illustrating a conventional three-tier architecture for providing network connections between computers over a computer network.
Figure 2A:
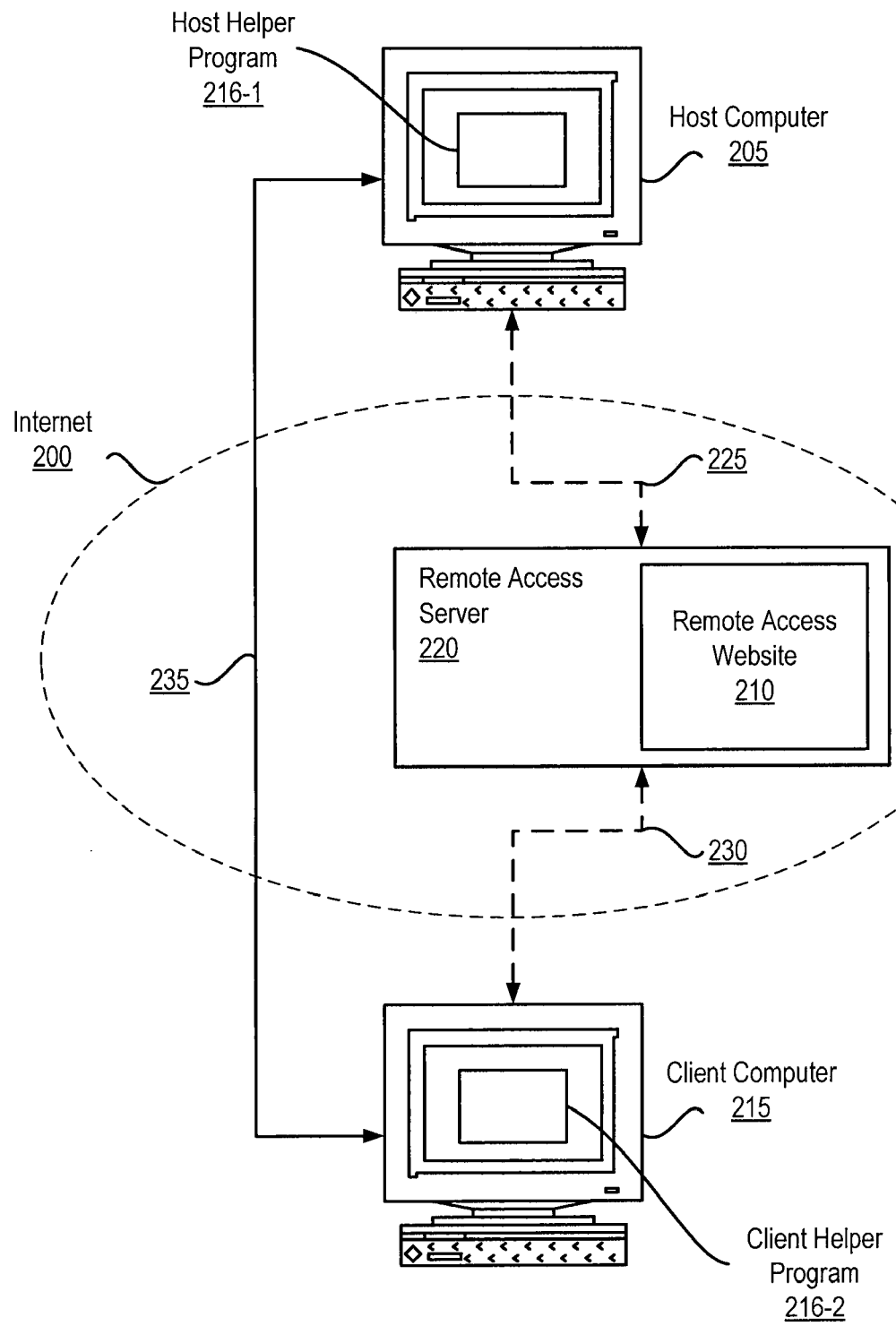
FIG. 2A is a block diagram illustrating a two-tier architecture for providing network connections between computers over a computer network in accordance with an embodiment of the present invention.

FIG. 2A illustrates a two-tier architecture for providing a network connection between two networked computers in accordance with one embodiment of the present invention. The embodiment illustrated by FIG. 2A comprises a host computer 205, a client computer 215, and a remote access server 220 hosting a remote access website 210. In one embodiment, the host computer 205, the client computer 215, and the remote access server 220 are each connected to the Internet 200. The host computer 205 runs a host helper program 216-1 and the client computer 215 runs a client helper program 216-2. In a two-tier architecture, the host computer 205 and the client computer 215 exchange data via a direct network connection 235, using the host helper program 216-1 and the client helper program 216-2 as will be explained in further detail below with reference to FIGS. 2B, 4, 5, and 6. Hence, unlike the conventional three-tier architecture shown in FIG. 1, the two-tier architecture of FIG. 2A does not require that all data packets pass through a remote access server 220.

For computers 205, 215 coupled to the Internet, an associated IP address provides a distinct destination to which data may be sent and from which data may be received. The two computers 205, 215 must somehow obtain one another's IP addresses before any data exchange between them may occur.

In the embodiment depicted in FIG. 2A, the computers 205, 215 are each coupled to the Internet 200, and a primary purpose of the remote access server 220 is to provide the IP address of the host computer 205 to the client computer 215. To this end, the remote access server 220 hosts a remote access website 210. A user of a computer 205, 215 may access the remote access website 210, log in to an account (e.g., supply the website 210 with a username and an associated password), and interact with the website 210 to select from a variety of services offered by the remote access server 220.

For example, the host computer 205 accesses the remote access service website 210 and selects to act as a host computer 205. Thus, the host computer 205 sends its IP address to the remote access server 220 via a network connection 225. The remote access server 220 stores the IP address of the host computer 205. When a client computer 215 subsequently accesses the remote access website 210 and selects to remote access the host computer 205, the remote access server 220 sends to the client computer 215 the IP address of the host computer 205 via a network connection 230.

Once the client computer 215 receives the IP address of the host computer 205, it may send data directly to the host computer 205 via a direct network connection 235. The term "direct," "directly," "direct connection" or "direct network connection" in the context of network connections is used herein to refer to network connections that do not go through the remote access server 220, but is not intended to mean that the connections do not involve any intermediary components such as switches or routers to facilitate conventional network connection. Moreover, the client computer 215 sends to the host computer 205 the IP address of the client computer 215 itself through the direct connection 235. In other words, while the IP address of the host computer 205 is sent to the client computer 215 through the remote access server 220 via the indirect connections 225, 230, the IP address of the client computer 215 is sent to the host computer 205 via the direct connection 235 without passing through the remote access server 220. Thus, both computers 205, 215 are able to obtain the other's IP address and create a direct network connection 235. Once both computers 205, 215 have the other computer's IP address, from this point onwards the remote access server 220 is not involved, and subsequent data exchange between the computers 205, 215 takes place via the direct network connection 235. Further details of a process for establishing a network connection according to the two tier architecture are provided below with reference to FIGS. 4, 5, and 6.

In a conventional three-tier architecture such as that depicted FIG. 1, the remote access server 120 obtains and stores both the IP address of the host computer 205 and the IP address of the client computer 215. However, as described above, according to the embodiment of the present invention as shown in FIG. 2A, the remote access server 220 does not store the IP address of the client computer 215. Rather, only the IP address of the host computer 215 is stored in the remote access server 220. This beneficially reduces the computing requirements of the remote access server 220, particularly as additional computers 205, 215 utilize the remote access services offered by the remote access server 220. As an illustrative example, it may be assumed that each host computer 205 is remote accessed by one-thousand client computers 215. If there are one-thousand host computers 205 utilizing the remote access server 220, the remote access server 220 must store one-thousand IP addresses (one per host computer 205). However, in a conventional three-tier architecture such as that depicted in FIG. 1, a remote access server 120 would need to store one-million IP addresses (one per host computer 205 plus one per client computer 215). Other computing resource requirements may scale similarly to the above example, thereby making a two-tier architecture in accordance with the present invention well suited to accommodating large numbers of host computers 205 and client computers 215.

Figure 2B:
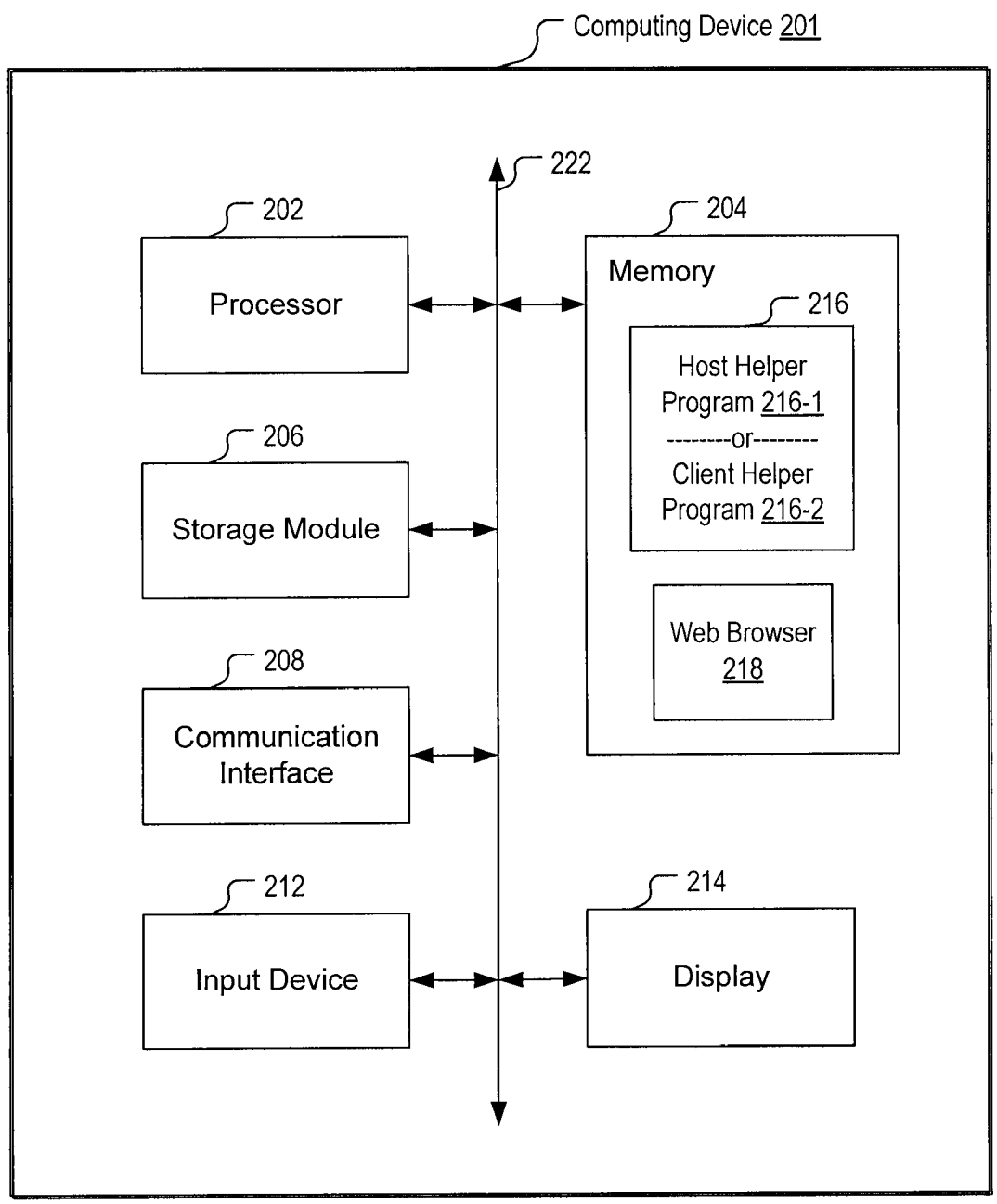
FIG. 2B is a block diagram illustrating a computer with which an embodiment of the present invention may be used.

FIG. 2B is a block diagram illustrating the hardware architecture of a computing device 201. The computing device 201 depicted in FIG. 2B may be either a host computer 205 or a client computer 215 in accordance with one embodiment of the present invention. In one embodiment, the computing device 201 is a general purpose personal computer including a processor 202, a memory 204, a storage module (e.g., hard disk drive) 206, a communication interface 208, an input device 212, and a display 214, all exchanging data with one another through a data bus 222. The memory 204 includes various application software such as a helper program 216 and a web browser 218. If the computing device 201 is a host computer 205, the helper program 216 is a host helper program 216-1. If the computing device 201 is a client computer 215, the helper program 216 is a client helper program 216-2. In some embodiments of the present invention, it is possible for a singe computing device 201 to act as both a host computer 205 and a client computer 215 simultaneously, in which case both a host helper program 216-1 and a client computer program 216-2 may be included in the memory 204.

The processor 202 is a conventional processor or controller. The memory 204 is a conventional computing memory such as a random access memory (RAM). The storage module 206 is a conventional long term storage device, for example, a hard drive (e.g., magnetic hard drive) or a flash memory drive. The communication interface 208 may include one or more interfaces used to transmit and receive data over a network such as the Internet. The communication interface 208 may be an Internet interface, a serial interface, a parallel interface, a USB (Universal Serial Bus) interface, an Ethernet interface, a Ti interface, a Bluetooth interface, a WiFi (IEEE 802.11) interface, or any other type of wired or wireless communication interface. The input device 212 may be any standard device which allows a user to interact with a computing device 201, such as a keyboard or a mouse. The display 214 may be an LCD or CRT computer monitor or any other device suitable for a computer display.

The web browser 218 is a software application executing on a processor 202 to allow the computing device 201 to display and interact with content accessed via the Internet. The web browser 218 may be any conventional web browser 218 such as Internet Explorer™ from Microsoft Corporation or Firefox™ from Mozilla.

The helper program 216 is a software application executing on a processor 202 within the computing device 201. Specifically, the helper program 216 is a software application designed to provide remote access services such as desktop sharing according to embodiments of the present invention. In one embodiment, a helper program 216 executing on a computing device 201 acting as a host computer 205, referred to herein as a "host helper program 216-1," is a Virtual Network Computing ("VNC") remote access host application. In one embodiment, a helper program 216 executing on a computing device 201 acting as a client computer 215, referred to herein as a "client helper program 216-2," is a remote access VNC viewer application.

The embodiment of the present invention illustrated in FIG. 2A may be adapted to include multiple host computers 205 and/or multiple client computers. To this effect, FIG. 2C and FIG. 2D illustrate two-tier architectures which provide remote access between one or more host computers 205 and multiple client computers 215 in accordance with embodiments of the present invention.

Figure 2C:
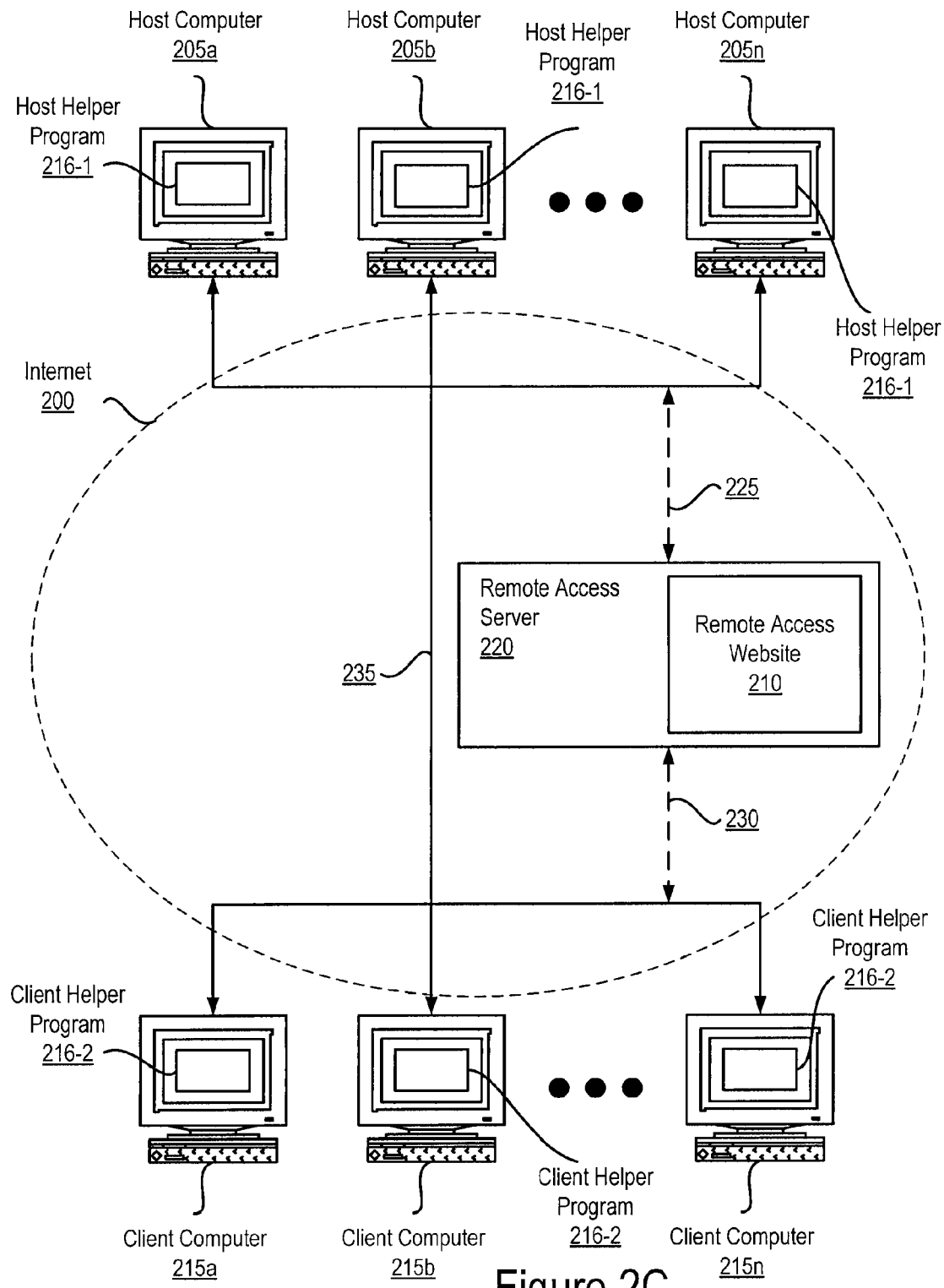
FIG. 2C is a block diagram illustrating a two-tier architecture for providing network connections between computers over a computer network in accordance with another embodiment of the present invention.
Figure 2D:
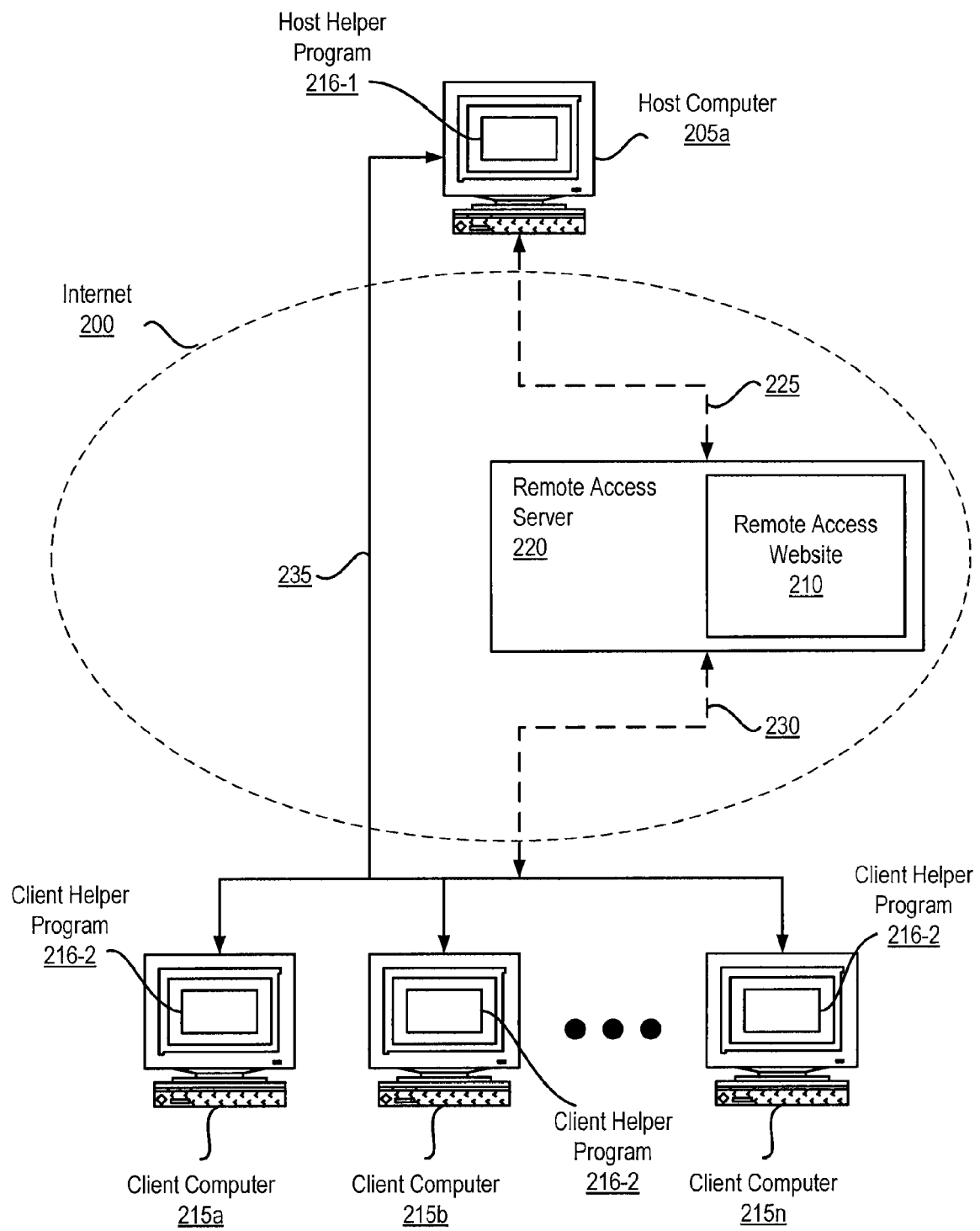
FIG. 2D is a block diagram illustrating a two-tier architecture for providing network connections between computers over a computer network in accordance with still another embodiment of the present invention.

FIG. 2C is a block diagram illustrating a two-tier architecture for providing network connections between computers over a computer network in accordance with another embodiment of the present invention. The embodiment illustrated by FIG. 2C comprises multiple host computers 205a, 205b, . . . 205n, multiple client computers 215a, 215b, . . . , 215n, and a remote access server 220 hosting a remote access website 210. In the two-tier architecture depicted in FIG. 2C, the host computers 205 and the client computers 215 exchange data via a direct network connection 235.

In one embodiment, remote access is provided for multiple host computers 205a, 205b, . . . 205n and multiple client computers 215a, 215b, . . . 215n via a process similar to that described above in reference to the embodiment of FIG. 2A. The host computers 205a, 205b, . . . 205n and the client computers 215a, 215b, . . . 215n are each individually coupled to the Internet 200, and a primary purpose of the remote access server 220 is to provide the IP address of the host computers 205a, 205b, . . . 205n to the client computers 215a, 215b, . . . 215n. The host computers 205a, 205b, . . . 205n access the remote access service website 210 and send their respective IP addresses to the remote access server 220 via a network connection 225. The remote access server 220 stores the respective IP addresses of the host computers 205. When a client computer 215a, 215b, . . . 215n subsequently accesses the remote access website 210, one or more of the available host computers 205a, 205b, . . . 205n are specified for remote access. Once one or more host computer 205a, 205b, . . . 205n have been specified, the remote access server 220 sends to the client computer 215a, 215b, . . . 215n the IP addresses of each specified host computer 205a, 205b, . . . 205n via a network connection 230.

Once a client computer 215a, 215b, . . . 215n has the IP address of the specified host computers 205a, 205b, . . . 205n, it may send data directly to the specified host computers 205a, 205b, . . . 205n via a direct network connection 235. Particularly, the client computer 215 may send to the specified host computers 205a, 205b, . . . 205n the IP address of the client computer 215a, 215b, . . . 215n itself via the direct network connection 235. Thus, the computers 205, 215 are able to obtain one another's IP addresses and create a direct network connection 235. Thus, from this point onwards the remote access server 220 need not be involved, and all subsequent data exchange between the computers 205, 215 may take place via the direct network connection 235.

FIG. 2D illustrates a two-tier architecture which facilitates desktop-sharing between a host computer 205 and multiple client computers 215 in accordance with still another embodiment of the present invention. The embodiment illustrated by FIG. 2D comprises a host computer 205a, multiple client computers 215a, 215b, . . . 215n, and a remote access server 220 hosting a remote access website 210. In the two-tier architecture depicted in FIG. 2D, the client computers 215a, 215b, . . . 215n are able to share the desktop of the host computer 205a via a direct network connection 235.

In one embodiment, desktop-sharing is facilitated using a process similar to that described in reference to the embodiment of FIG. 2A. The computers 205a, 215a, 215b, . . . 215n are each individually coupled to the Internet 200, and a primary purpose of the remote access server 220 is to provide the IP address of the host computer 205a to the client computers 215a, 215b, . . . 215n. The host computer 205a accesses the remote access service website 210 and sends its IP address to the remote access server 220 via a network connection 225. The remote access server 220 stores the IP address of the host computer 205a. When one of the client computers 215a, 215b, . . . 215n subsequently accesses the remote access website 210, the remote access server 220 sends to the client computer 215a, 215b, . . . 215n the IP address of the host computer 205a via a network connection 230.

Once the client computer 215a, 215b, . . . 215n has the IP address of the host computer 205a, it may send data directly to the host computer 205a via a direct network connection 235. Particularly, the client computer 215a, 215b, . . . 215n may send to the host computer 205a the IP address of the client computer 215a, 215b, . . . 215n itself via the direct network connection 235. Thus, both computers 205a, and 215a, 215b, . . . 215n are able to obtain one another's IP addresses and create a direct network connection 235. Thus, from this point onwards the remote access server 220 need not be involved, and all subsequent data exchange related to a client computer 215a, 215b, . . . 215n sharing the desktop of a host computer 205a may take place via the direct network connection 235.

In an additional embodiment of the present invention, the two-tier architecture illustrated in FIG. 2D and the accompanying methods described herein are adapted to provide a web-meeting between a host computer 205 and one or more client computers 215.

Process Considerations

Figure 3:
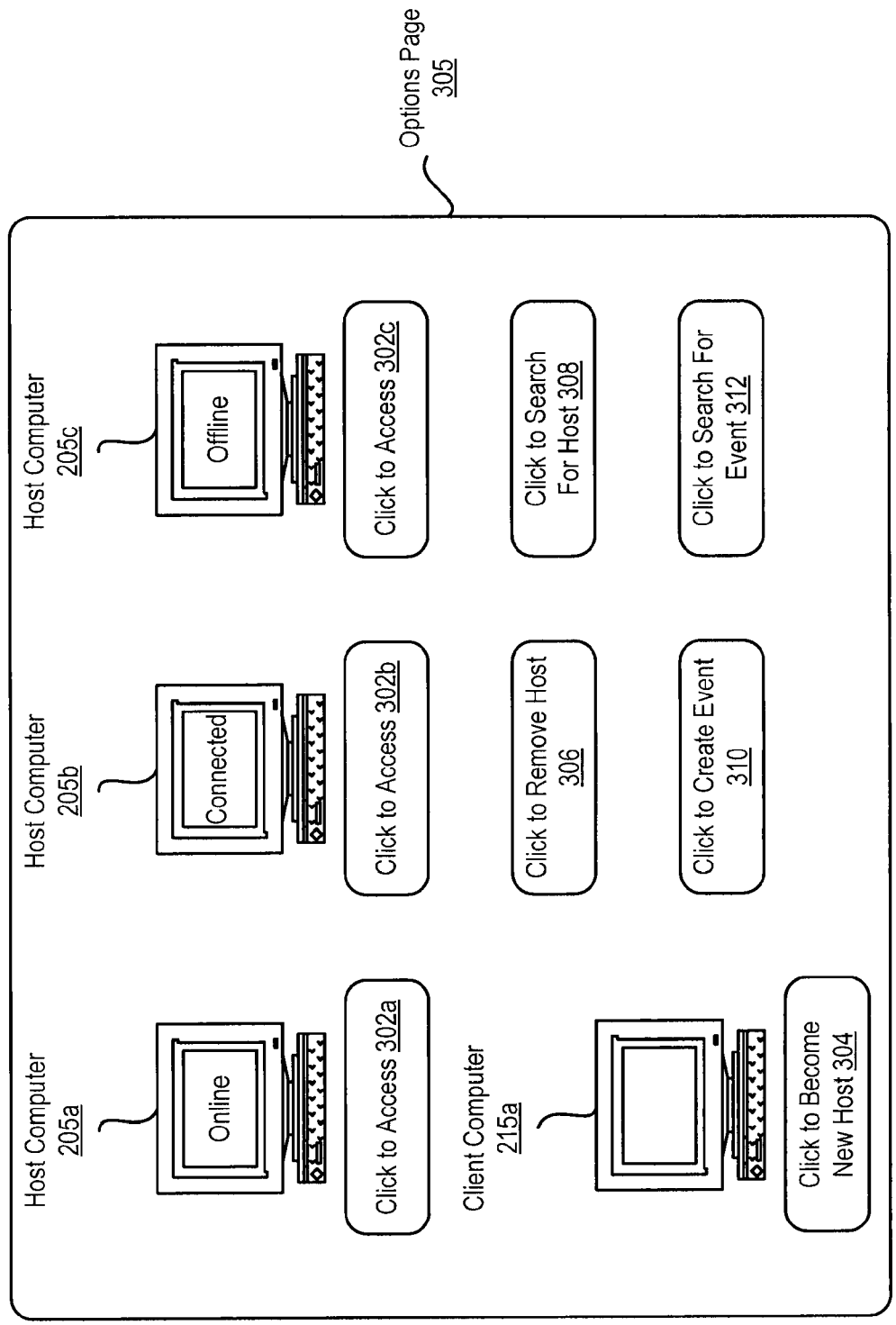
FIG. 3 is a snapshot of a web page hosted by a remote access server in accordance with an embodiment of the present invention.

In one embodiment of the present invention, a remote access website 210 provides multiple web pages which allow a user to utilize the services of a remote access server 220. When a user visits the remote access website 210 via a web browser 218, the user may log into the website 210 by providing a username and an associated password in accordance with standard Internet techniques. After logging in, the user may select to use the services provided by the remote access server 220 by interacting with an options page 305. FIG. 3 illustrates an options page 305 in accordance with one embodiment of the present invention. In one embodiment, an options page 305 comprises a file in PHP, ASPX, or HTML format.

The options page 305 provides selectable icons which correspond to services provided by the remote access server 220. In one embodiment, the options page 305 lists one or more host computers 205 the user may access through the two-tier remote access service according to embodiments of the present invention. Additionally, the options page 305 presents the status of the selectable host computers 205a, 205b, 205c. In one embodiment, a host computer may have a status of connected, online, or offline. A host computer 205c which is presently offline may not be accessed. A host computer 205c may be offline because it does not have Internet connection or is not running. A host computer 205a that is "online" may be accessed using the two-tier remote access service according to embodiments of the present invention. A host computer 205b that is "connected" is already being accessed using the two-tier remote access service according to embodiments of the present invention. The user of a client computer 215 may select a host computer 205a, 205b that has a status of "connected" or "online" using the corresponding icon 302a, 302b to obtain remote access to the host computer 205a, 205b according to the two-tier architecture for remote access in accordance with various embodiments of the present invention.

Additionally, the user may select to grant other client computers 215 remote access to the user's computer by itself becoming a host computer 205, using icon 304. The user may also select to remove a host computer 205 from the list of accessible host computers 205 using icon 306, or select to search for an un-displayed host computer 205 using icon 308.

Moreover, the user may select to create an event such as a web-meeting or desktop-sharing session using icon 310. Alternatively, the user may select to search for a web-meeting or desktop-sharing session organized by a different user using icon 312. The options depicted in FIG. 3 and described above are provided for illustrative purposes only and are not intending to be limiting. Additional user-selectable options may be offered by a remote access server 220 and/or presented on an options page 305 of a remote access website 210.

Figure 4:
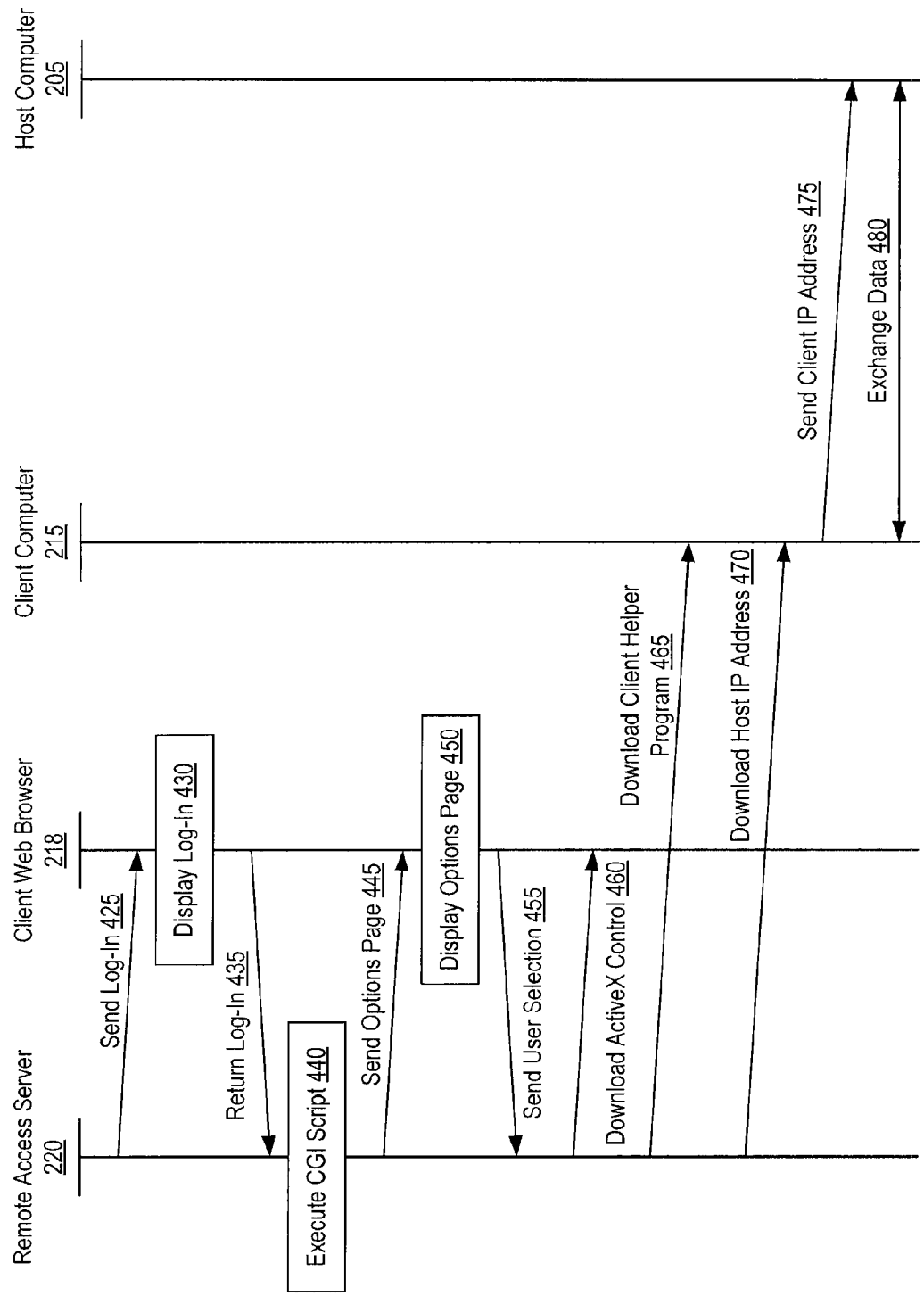
FIG. 4 is an event diagram illustrating a process for providing network connections between computers over a computer network in accordance with an embodiment of the present invention

Referring now to FIG. 4, a process corresponding to a two-tier architecture for providing a network connection between two networked computers is presented. The process illustrated in FIG. 4 corresponds to a two-tier architecture including a host computer 205, a client computer 215 executing a client web browser 218, and a remote access server 220 hosting a remote access website 210 (FIG. 2A). When the client computer 215 accesses the remote access website 210 via the client web browser 218, the remote access server 220 sends 425 a log-in form to the client web browser 218. In one embodiment, the log-in form comprises a web page file in PHP, ASPX, or HTML format. The client web browser 218 then displays 430 the log-in form (not shown herein). Once the log-in form is completed, client web browser 218 returns 435 the completed log-in form to the remote access server 220.

In one embodiment, the return 435 of the completed log-in form causes the remote access server 220 to execute 440 a designated common gateway interface (CGI) script. In one embodiment, the CGI script may include commands implemented in the PERL programming language which cause the remote access server 220 to send 445 an options page 305 (FIG. 3) to the client web browser 218. The client web browser 218 then displays 450 the options page 305, allowing an option to be selected. As explained above, the user of the client computer 215 may select the icon 302 to access the host computer 205 or other icons for other options. The user selection is then sent 455 to the remote access server 220. Based on the selection, an ActiveX control is downloaded 460 to the client web browser 218 from the remote access server 220.

If the selection is to access a host computer 205, an ActiveX control will be downloaded 460 to: (i) download 465 a client helper program 216-2 to the client computer 215, (ii) download 470 the IP address of the host computer 205 to the client computer 215, and (iii) using the downloaded 470 IP address of the host computer 205, connect a client helper program 216-2 on the client computer 215 to a host helper program 216-1 on the host computer 205. Connecting the two helper programs 216-1, 216-2 includes the client computer 215 sending 475 the IP address of the client computer 215 to the host computer 205. Once the helper program 216-2 on the client computer 215 and the helper program 216-1 on the host computer 205 are connected, data may be exchanged 480 directly between the two computers 205, 215 without any data passing through the remote access server 220. In some embodiments, rather than downloading 465 a client helper program 216-2 to the client computer 215, the downloaded 460 ActiveX control may activate a client helper program 216-2 already present on the client computer 215 (not shown herein)

In another embodiment, if the selection is to become a new host, a process slightly different from that depicted in FIG. 4 takes place. Specifically, an ActiveX control will be downloaded 460 to: (i) download (not shown) a host helper program 216-1 to the client computer 215, (ii) enter a listening mode to wait for connection requests from the client helper programs 216-2 of one or more other client computers 215. At this point, the client computer 215 is now also acting as a host computer 205. Accordingly, its IP address is sent to and stored by the remote access server 220 so that it may later be provided to other client computers 215 which request it.

Figure 5:
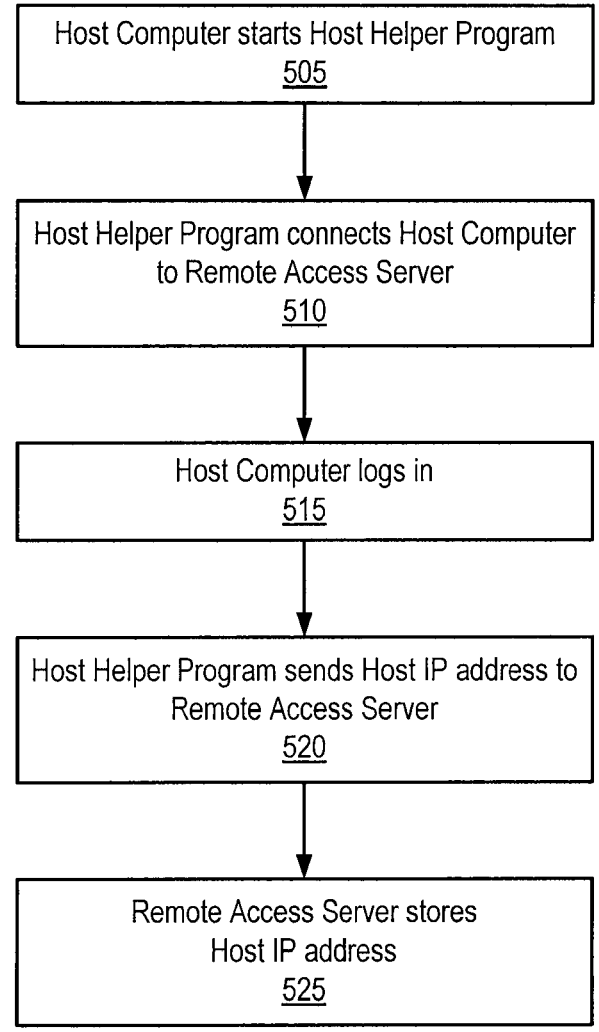
FIG. 5 is a flowchart illustrating a process performed by a host computer to provide network connections between computers over a computer network in accordance with an embodiment of the present invention.

FIG. 5 presents a flowchart of a process performed by a host computer 205 to provide network connections between computers over a computer network in accordance with an embodiment of the present invention. First, the host computer 205 starts 505 the host helper program 216-1. In one embodiment, the host helper program 216-1 is a VNC remote access host application. The host helper program 216-1 then connects 510 the host computer 205 to a remote access server 220.

Once the host computer 205 is connected 510 to the remote access server 220, the host computer 205 logs in 515 to a remote access website 210 hosted by the remote access server 220. The host helper program 216-1 then sends 520 the IP address of the host computer 205 to the remote access web server 220. The remote access server 220 stores 525 the IP address of the host computer 205 for later distribution to client computers 215.

Figure 6:
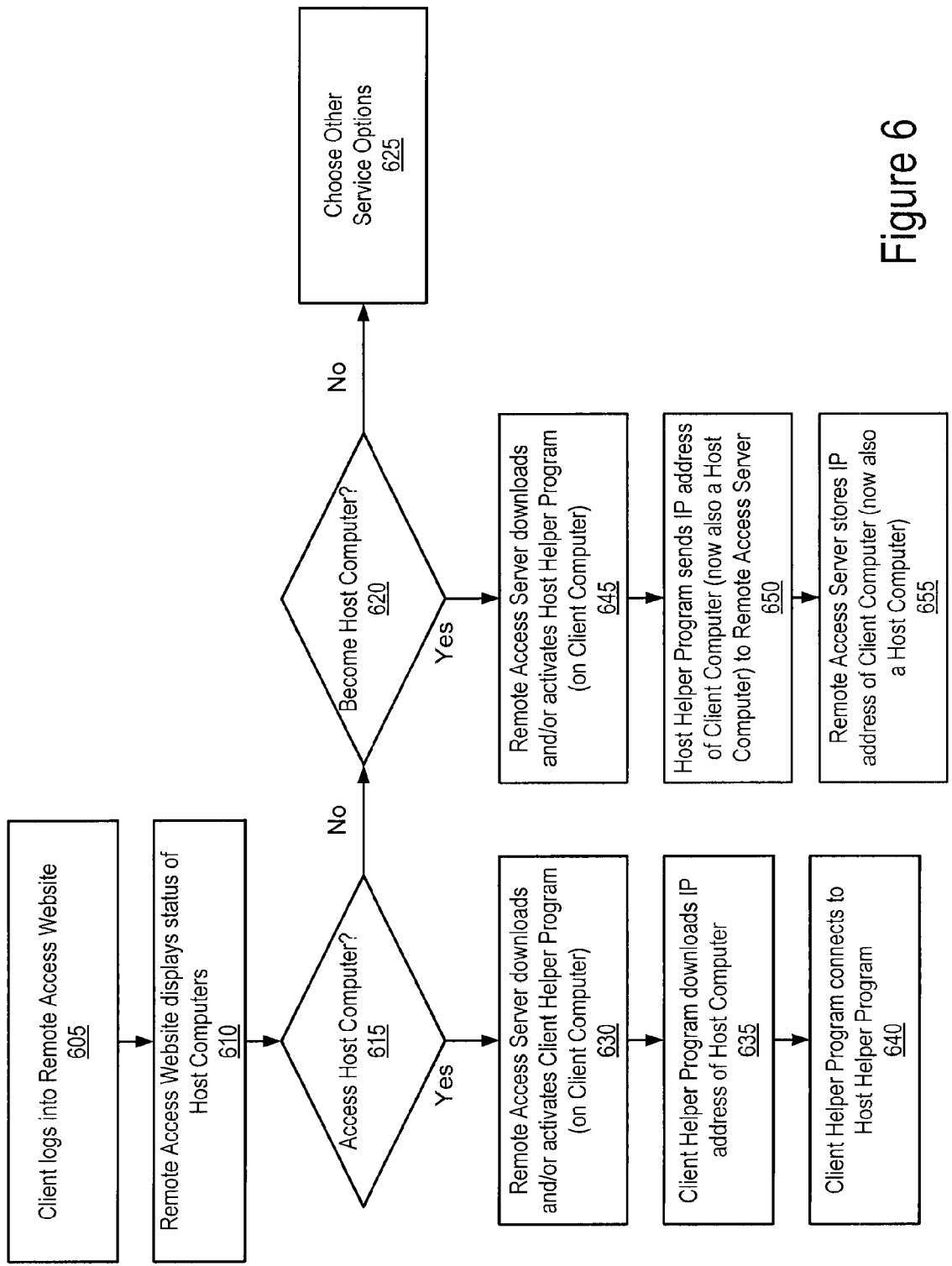
FIG. 6 is a flowchart illustrating a process performed by a client computer to provide network connections between computers over a computer network in accordance with an embodiment of the present invention.

FIG. 6 presents a flowchart of a process performed by a client computer 215 to provide network connections between computers over a computer network in accordance with an embodiment of the present invention. The client computer 215 logs in 605 to a remote access website 210 hosted by a remote access server 220. The remote access website 210 then displays 610 the status of one or more host computers 205. In one embodiment, the status of one or more host computers 205 are displayed on an options page 305 such as that depicted in FIG. 3.

If the client computer 215 selects to access a host computer 205 at step 615, the remote access server 220 downloads and/or activates 630 a client helper program 216-2 on the client computer 215. The client helper program 216-2 then downloads 635 the IP address of the selected host computer 205. Using the downloaded 635 IP address of the host computer 205, the client helper program 216-2 connects 640 to a host helper program 216-1 on the host computer 205 and further data exchange for desktop sharing, web-conferencing or other types of remote access between the host computer 205 and the client computer 215 occurs via direct connection 235 (FIG. 2A) using the two helper programs 216-1, 216-2.

If the client computer 215 selects to become a host computer 205 (step 615—No and step 620—Yes), the remote access server 220 downloads and/or activates 645 a host helper program 216-1 on the client computer 215. The client computer 215 (now also a new host computer 205) then sends 650 its IP address to the remote access server 220, where it is stored 655 for future distribution to one or more other client computers 215.

Finally, the user may choose 625 other service options other than accessing a host computer or becoming a host computer (step 615—No, and step 620—No).

In some instances, a host computer 205 may have a dynamic IP address, complicating the creation of a network connection using a two-tier architecture. For example, the host computer 205 may be coupled to the Internet through an Internet service provider ("ISP"). Often, an ISP has a limited number of Internet connections and therefore a limited number of IP addresses it may allocate at any one time. Thus, when a host computer 205 connects to the Internet through an ISP, it is dynamically assigned a new IP address each time it connects. The present invention solves the problem of dynamic IP address and sends the new IP address each time a host computer 205 connects to the Internet through an ISP.

Private Network Considerations

A host computer 205 may reside on a private network (e.g., an internal network for a company or organization). The Internet Assigned Numbers Authority ("IANA") allocates a designated set of IP addresses for private networks, and routers on the Internet are configured to discard any data packets associated with IP addresses from that designated set. Private networks typically include a computer network security barrier, commonly called a "firewall," to prevent unauthorized intrusion into the private network. As such, the IP address of a host computer 205 on a private network is not unique (i.e., other computers on private networks elsewhere globally may have the same IP address) and not accessible from the public Internet.

Figure 7:
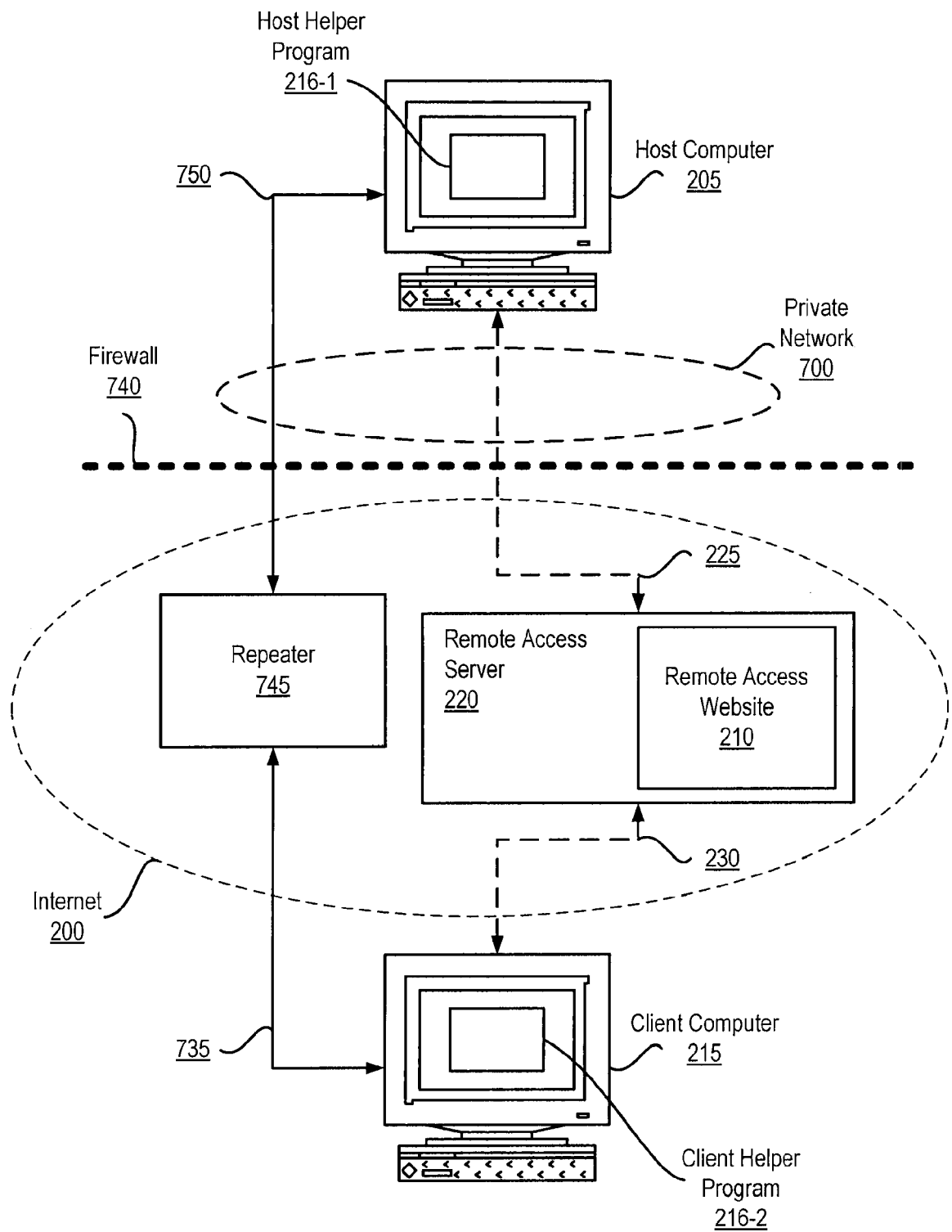
FIG. 7 is a block diagram illustrating a two-tier architecture for providing network connections between computers over a computer network in accordance with still another embodiment of the present invention.

FIG. 7 illustrates a two-tier architecture, in accordance with one embodiment of the present invention, suitable for providing a network connection when one of the networked computers does not have a unique, publicly accessible IP address. The embodiment depicted in FIG. 7 includes a host computer 205, a client computer 215, a remote access server 220 hosting a remote access website 210, a firewall 740, and a repeater 745. The host computer 205 is connected to the Internet 200 through a private network 700. The private network 700 is protected by the firewall 740. Thus, the host computer 205 and the client computer 215 are both connected to the Internet 200, but are separated by the firewall 740.

In one embodiment, the two-tier architecture depicted in FIG. 7 functions largely as the two-tier architecture described above in reference to FIG. 2A, with a few modifications. Specifically, a repeater 745 is added which has a unique, publicly accessible IP address. The repeater 745 may be provided by a vendor providing remote access services using the remote access server 220. The host computer 205 may be able to access the repeater 745 and form a network connection 750. Thus, the repeater 745 provides a unique, publicly accessible IP address by which a client computer 215 outside of the private network 700 may access the host computer 205.

In one embodiment, when the host computer 205 accesses the remote access website 210, it sends the IP address of the repeater 745 to the remote access server 220 via a network connection 225. In an alternative embodiment, the remote access server 220 may already have the IP address of the repeater 745, because the remote access server 220 provided the repeater 745 to the host computer 205. In either embodiment, the remote access server 220 stores the IP address of the repeater 745. When a client computer 215 subsequently accesses the remote access website 210 and selects to remote access the host computer 205, the remote access server 220 sends to the client computer 215 the IP address of the repeater 745 via a network connection 230. Once the client computer has the IP address of the repeater 745, it may send data to the repeater 745 via a direct network connection 735. Moreover, the client computer 215 sends to the repeater 745 the IP address of the client computer 215 itself through the direct network connection 735. In other words, while the IP address of the repeater 745 is sent to the client computer 215 through the remote access server 220 via the indirect connections 225, 230, the IP address of the client computer 215 is sent to the repeater 745 via the direct connection 735. Thus, the client computer 215 and the repeater 745 are able to obtain one another's IP addresses and create a direct network connection 735. From this point onwards, the remote access server 220 is not involved in communicating data between host computer 205 and client computer 215, and subsequent data exchange between the host computer 205 and the client computer 215 takes place via connection 750 and the direct network connection 735. For the purpose of clarity, further details of a process for establishing a network connection with a host computer 205 on a private network 700 according to a two tier architecture are provided below with reference to FIGS. 8, 9, and 10.

It should be noted that the repeater 745 does not provide any functions related to actively hosting a remote access session. For example, the repeater 745 does not interpret any data packets as they pass between the two computers 205, 215. Rather, it merely retransmits them, importantly forming a bridge between the non-accessible private network 700 and the public Internet 200, to facilitate data exchange. In one embodiment, multiple repeaters 745 may be provided for access by a single host computer 205 or a group of host computers 205 on a single private network 700. This advantageously prevents a repeater 745 from acting as a single point-of-failure within the system.

In some embodiments, the two-tier architectures depicted by FIG. 7, FIG. 2C, and FIG. 2D are adapted using the above-described techniques to provide remote access services for multiple host computers 205 on private networks and/or multiple client computers 215. In such embodiments, the repeater 745 may need to distinguish between multiple host computers 205 to ensure that data is transmitted only to one or more proper destinations.

The remote access server 220 may send a unique meeting ID corresponding to a meeting session to be shared by the host computer 205 and the client computer 215 to the client computer 215 along with the IP address of the repeater 745. The client computer 215 may then send to the repeater 745 the unique meeting ID along with the IP address of the client computer 215. In one embodiment, the remote access server 220 also sends the unique meeting ID to the host computer 205, which in turn sends it to the repeater 745. The repeater 745 may store both the unique meeting ID and the associated IP address of the host computer 205 in a look-up table. Thus, when a client computer 215 sends data to a host computer 205, it may designate the data as corresponding to the particular meeting ID, allowing the repeater 745, using the look-up table, to transmit the data to the appropriate host computer 205.

Use of the repeater 745 in the private network environment shown in FIG. 7 has many benefits. For example, the repeater 745 is able to operate in a multicast fashion in which the same data packet is retransmitted between multiple host computers 205 and/or multiple client computers 215. Typical Internet routers do not have this capability as they only support unicast operation due to cost and complexity considerations. Additionally, the repeater 745 is distinct from typical Internet routers in its use of an RFB (remote framebuffer) protocol, which beneficially significantly reduces system complexity compared to the conventional use of an ITU T.120 protocol.

More specifically, conventional communication protocols such as ITU T.120 (Multipoint Data Conferencing and Real Time Communication Protocols including T.121, T.122, T.123, T.124, and T.125) are used for multipoint network data communications. The ITU T.120 protocols can enable two or more computers to make connections, transmit and receive data between each other, and collaborate using compatible data conferencing features such as remote access, desktop sharing, desktop data conferencing, multipoint meetings, multi-user applications, multi-player games, and the like.

However, ITU T.120 implements multipoint network data communications by direct point-to-point communication between the computers, made possible by very complex communication protocols. The complexity of a network using the ITU T.120 standard for multipoint data conferencing, for example, increases exponentially with the number of nodes (or computers) in the network. In addition, ITU T.120 typically requires use of non-standard UDP (User Defined Protocols) and non-port-80 for the direct point-to-point communications, which are typically blocked by corporate firewalls 740 in order to filter software viruses, worms, and the like. Thus, it is complicated to implement ITU T.120 in corporate computing environments that have firewalls 740 installed therein.

The repeater 745 using an RFB protocol has the benefit of being significantly simpler to implement compared to a device using T.120. In addition, the complexity of the network using the repeater 745 with an RFB protocol increases merely linearly for increases in the number of clients in a distributed computing network. Moreover, the use of standard Internet protocols (e.g. HTTP, TCP/IP, and the like) and port 80 by the repeater 745 enables easy penetration of corporate firewalls 740, because corporate firewalls 740 typically allow port 80 to be used for Internet access using standard Internet protocols. It is noted that in an embodiment of the invention, a repeater 745 may be provided for a host computer 205 on a public network to gain the same benefits above.

Typically, a private network with a firewall 740 will also have a SOCKS proxy executing between the client web browser 218 and the remote access server 220. In such an embodiment, the CGI script executed 440 by the remote access server 220 is forced to download the IP address of the SOCKS proxy rather than the IP address of the host computer 205. To resolve this issue, a name registration daemon is provided by the remote access server 220 which registers the IP address and port number of each host computer 205 or client computer 215. When the helper programs 216-1, 216-2 start on computers 205, 215, the helper programs 216-1, 216-2 connect to the daemon, allowing the daemon to register the IP address of the computers 205, 215.

Figure 8:
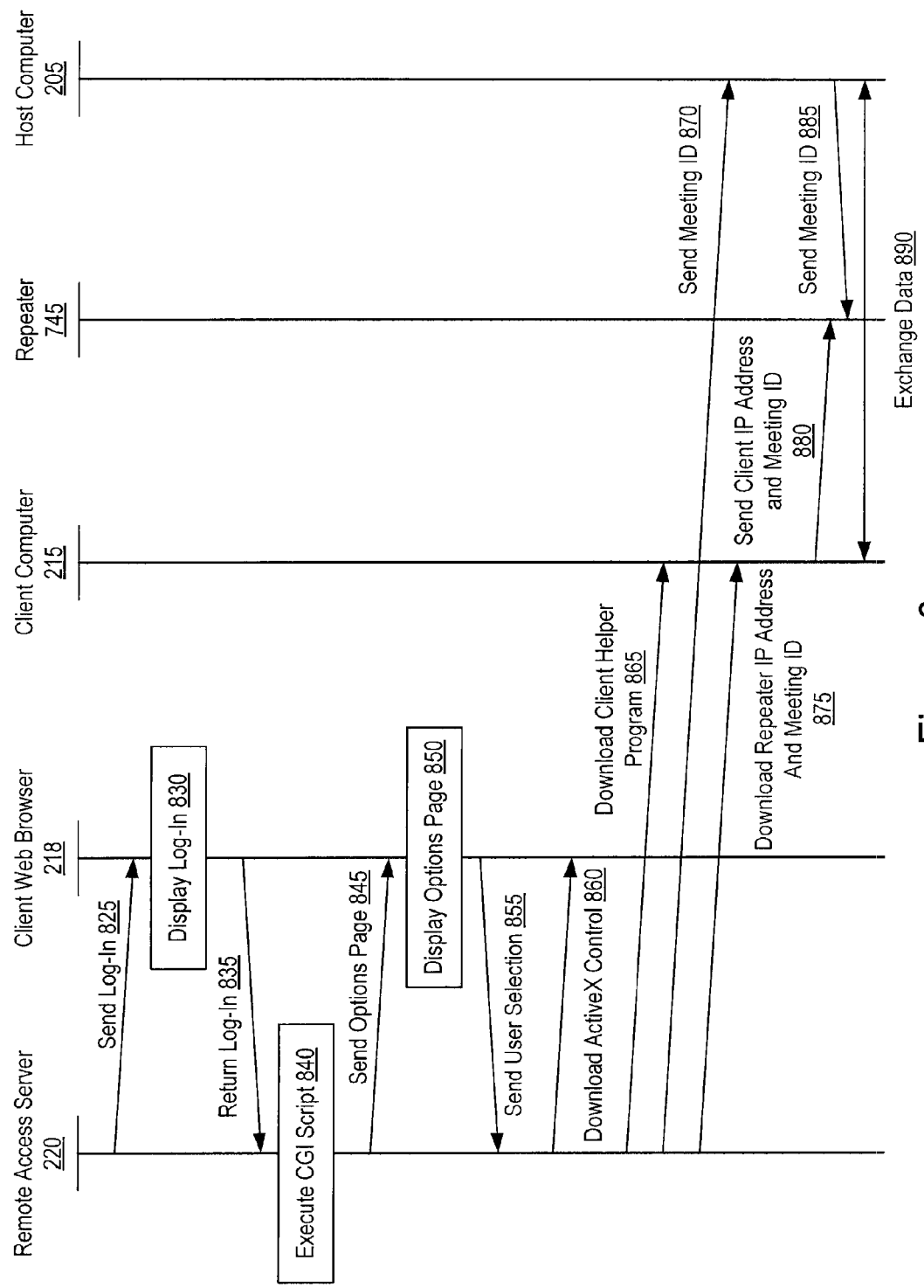
FIG. 8 is an event diagram illustrating a process for providing network connections between computers over a computer network in accordance with another embodiment of the present invention

Referring now to FIG. 8, a process is illustrated for providing a network connection between a client computer 215 and a host computer 205 on a private network in accordance with one embodiment of the present invention. Though the process illustrated in FIG. 8 has many similarities with the process illustrated in FIG. 4, it is worthwhile to note some of the key differences. The process steps in FIG. 8 are substantially the same as those illustrated in FIG. 4, except steps 870, 875, 880, 885, and 890 and that a repeater 745 is involved. Specifically, the event diagram of FIG. 8 corresponds to a two-tier architecture including a repeater 745 with a host computer 205 on a private network 700. When a host computer 205 is on a private network 700, a unique meeting ID is sent 870 by the remote access server 220 to the host computer 205. The unique meeting ID is also downloaded 875 from the remote access server 220 by the client computer 215 along with the IP address of the repeater 745. Then, the IP address of the client computer 215 and the meeting ID are sent 880 by the client computer 215 to the repeater 745. The host computer 205 also sends 885 the meeting ID to the repeater 745. From this point onwards, data may be exchanged 890 between the client computer 215 and the host computer 205 with the repeater 745 acting as a bridge between the private network 700 and the Internet 200. As explained above, when client computer 215 sends data to a host computer 205, it may designate the data as corresponding to the particular meeting ID, allowing the repeater 745, using the look-up table, to transmit the data to the appropriate host computer 205.

Figure 9:
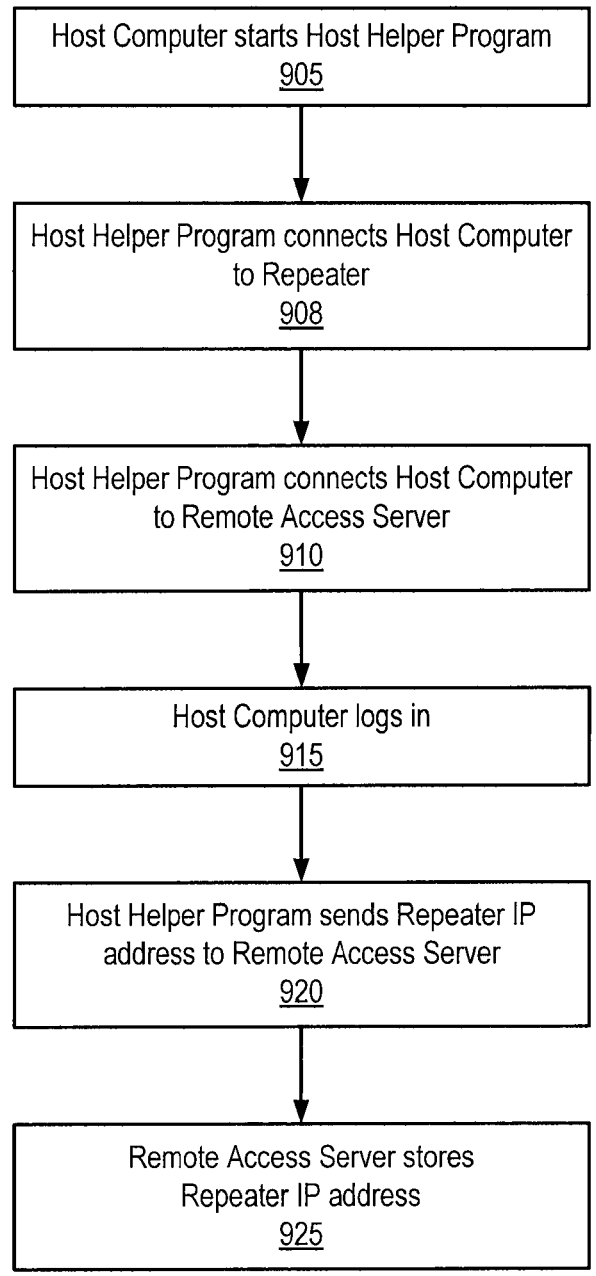
FIG. 9 is a flowchart illustrating a process performed by a host computer to provide network connections between computers over a computer network in accordance with another embodiment of the present invention.

FIG. 9 presents a flowchart of a process performed by a host computer 205 on a private network 700 to provide network connections between computers over a computer network in accordance with an embodiment of the present invention. First, the host computer 205 starts 905 the host helper program 216-1. In one embodiment, the host helper program 216-1 is a VNC remote access host application. The host helper program 216-1 then connects 908 the host computer 205 to a repeater 745. Once the host computer 205 is connected 908 to the repeater 745, the host helper program 216-1 connects 910 the host computer 205 to the remote access server 220. This allows a remote access website 210 hosted by the remote access server 220 to accurately reflect the status of the host computer 205 on an options page 305. The host computer 205 logs in 915 to a remote access website 210 hosted by the remote access server 220. The host helper program 216-1 then sends 920 the IP address of the repeater 745 to the remote access web server 220. The remote access server 220 stores 925 the IP address of the repeater 745 for later distribution to client computers 215.

FIG. 10 presents a flowchart of a process performed by a client computer 215 to provide a network connection with a host computer 205 on a private network in accordance with an embodiment of the present invention. The process steps in FIG. 10 are substantially the same as those illustrated in FIG. 6, except steps 1035 and 1040. Since the host computer 205 is in a private network communicating with the public Internet network 200 through repeater 745, it is the IP address of the repeater 745 that is downloaded 1035 by the client helper program 216-2. Also, when the client helper program 216-2 connects 1040 to the host helper program 216-1, the connection 1040 is through the repeater 745.

It should be understood that in some embodiments of the present invention, a repeater 745 may be provided for a host computer 205 on a public network such as the Internet 200 with the methods described above for providing remote access adjusted accordingly. In one embodiment, a repeater 745 for a host computer 205 on a public network may be implemented as part of the host computer 205. In one embodiment, a repeater 745 for a host computer 205 on a private network 700 may be implemented on a computer separate from the host computer 205.

Additional Considerations

It is noted that in one embodiment, the processes described herein are configured for operation as software or a computer program product. The software can be stored as instructions in a computer readable medium such as a memory 204 or a storage module (or device) 206 and is executable. The instructions (e.g., steps) of the process may also be configured as one or more hardware or software modules that are configured to perform the function or functions described herein.

It is also noted that although the disclosure herein makes references in some embodiments to interaction between a host computer and a client computer, the principles disclosed herein are applicable to any configuration in which two computing devices are communicatively coupled. For example, in some embodiments there may be communications between a first computing device and a second computing device wherein the first device can be any computing type device (e.g., a server computer system, a personal computer, a desktop computer, a laptop computer, a personal digital assistant, a gaming device, a smart phone, etc.) and the second device can be any computing device (e.g., also a server computer system, a personal computer, a desktop computer, a laptop computer, a personal digital assistant, a gaming device, a smart phone, etc), of which one device may be a host and the other device may be a client, or the devices may be peers (e.g., peer to peer connection).

Upon reading this disclosure, those of ordinary skill in the art will appreciate still additional alternative structural and functional designs for a system and a process for two-tiered remote access between computers through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a server for facilitating remote access between one or more first computers and one or more second computers coupled to a network, a computer-implemented method comprising:

receiving from one of the first computers a first internet protocol (IP) address corresponding to said one of the first computers;

storing in the server the first IP address corresponding to said one of the first computers;

receiving, by the server, a request from one of the second computers to establish remote access to said one of the first computers; and the server sending to said one of the second computers the stored first IP address corresponding to said one of the first computers responsive to the server receiving the request from said one of the second computers to establish remote access to said one of the first computers, said one of the second computers directly connecting to said one of the first computers identified by the first IP address and said one of the second computers sending a second IP address corresponding to said one of the second computers directly to said one of the first computers without the second IP address passing through the server and without the second IP address being stored by the server, the second IP address enabling said one of the first computers to directly exchange data with said one of the second computers, wherein the second IP address is not received by said one of the first computers prior to said one of the second computers directly connecting to said one of the first computers.

2. The method of claim 1, wherein said one of the second computers exchanges data with said one of the first computers via a direct network connection using the first IP address and second IP address, respectively.

3. The method of claim 1, wherein receiving a request from one of the second computers to establish remote access to said one of the first computers comprises:

hosting a website displaying the first computers; and receiving from one of the second computers a selection of said one of the first computers for remote access.

4. The method of claim 1, wherein the first IP address corresponding to said one of the first computers is a publicly accessible IP address corresponding to a repeater to which said one of the first computers is communicatively coupled.

5. The method of claim 4, further comprising:

assigning a unique identifier to said one of the first computers; and sending to said one of the second computers the unique identifier, said one of the second computers directly connecting to the repeater identified by the first IP address and sending the unique identifier assigned to said one of the first computers directly to the repeater.

6. A non-transitory computer readable storage medium storing computer instructions for facilitating remote access between one or more first computers and one or more second computers coupled to a network, the instructions when executed by a processor on a server causing the processor to:

receive from one of the first computers a first internet protocol (IP) address corresponding to said one of the first computers;

store in the server the first IP address corresponding to said one of the first computers;

receive, by the server, a request from one of the second computers to establish remote access to said one of the first computers; and send, by the server, to said one of the second computers the stored first IP address corresponding to said one of the first computers responsive to the server receiving the request from said one of the second computers to establish remote access to said one of the first computers, said one of the second computers directly connecting to said one of the first computers identified by the first IP address and said one of the second computers sending a second IP address corresponding to said one of the second computers directly to said one of the first computers without the second IP address passing through the server and without the second IP address being stored by the server, the second IP address enabling said one of the first computers to directly exchange data with said one of the second computers, wherein the second IP address is not received by said one of the first computers prior to said one of the second computers directly connecting to said one of the first computers.

7. The computer readable medium of claim 6, wherein said one of the second computers exchanges data with said one of the first computers via a direct network connection using the first IP address and second IP address, respectively.

8. The computer readable medium of claim 6, wherein receiving a request from one of the second computers to establish remote access to said one of the first computers comprises:

hosting a website displaying the first computers; and receiving from one of the second computers a selection of said one of the first computers for remote access.

9. The computer readable medium of claim 6, wherein the first IP address corresponding to said one of the first computers is a publicly accessible IP address corresponding to a repeater to which said one of the first computers is communicatively coupled.

10. The computer readable medium of claim 9, the instructions further causing the processor to:

assign a unique identifier to said one of the first computers; and send to said one of the second computers the unique identifier, said one of the second computers directly connecting to the repeater identified by the first IP address and sending the unique identifier assigned to said one of the first computers directly to the repeater.

11. A non-transitory computer readable storage medium storing computer instructions for facilitating remote access between one or more first computers and one or more second computers coupled to a network, the instructions when executed by a processor on one of the second computers configured to cause the processor to:

send, by a second computer, a request to a server to establish remote access to one of the first computers;

receive, at said second computer, from the server a first internet protocol (IP) address corresponding to said one of the first computers responsive to sending the request to the server;

store the first IP address;

establish a direct connection with said one of the first computers identified by the first IP address; and send a second IP address corresponding to said one of the second computers directly to said one of the first computers without the second IP address passing through the server and without the second IP address being stored by the server, the second IP address enabling said one of the first computers to directly exchange data with said one of the second computers, wherein the second IP address is not received by said one of the first computers prior to said one of the second computers directly connecting to said one of the first computers.

12. The computer readable medium of claim 11, wherein the instructions are further configured to cause said one of the second computers to exchange data with said one of the first computers via a direct network connection using the first IP address and second IP address, respectively.

13. The computer readable medium of claim 11, wherein the first IP address corresponding to said one of the first computers is a publicly accessible IP address corresponding to a repeater to which said one of the first computers is communicatively coupled.

14. The computer readable medium of claim 13, wherein the instructions are further configured to cause said one of the second computers to exchange data with the repeater via a direct network connection using the first IP address and second IP address, respectively.

15. The computer readable medium of claim 14, the instructions further causing the processor to:

receive from the server a unique identifier assigned by the server to said one of the first computers; and send the unique identifier assigned to said one of the first computers directly to the repeater.

16. In a server for facilitating a web conference between one or more first computers and one or more second computers coupled to a network, a computer implemented method comprising:

receiving from one of the first computers a first internet protocol (IP) address corresponding to said one of the first computers;

storing in the server the first IP address corresponding to said one of the first computers;

receiving, by the server, a request from one of the second computers to join a web conference with said one of the first computers; and sending, by the server, to said one of the second computers the stored first IP address corresponding to said one of the first computers responsive to the server receiving the request from said one of the second computers to join the web conference with said one of the first computers, said one of the second computers joining the web conference by directly connecting to said one of the first computers identified by the first IP address, and said one of the second computers sending a second IP address corresponding to said one of the second computers directly to said one of the first computers without the second IP address passing through the server and without the second IP address being stored by the server, the second IP address enabling said one of the first computers to directly exchange data in the web conference with said one of the second computers, wherein the second IP address is not received by said one of the first computers prior to said one of the second computers directly connecting to said one of the first computers.

17. The method of claim 16, wherein receiving the request from one of the second computers to join the web conference comprises:

hosting a website displaying the first computers; and
receiving from one of the second computers a selection of said one of the first computers that is currently in the web conference.

* * * * *